E. C. MESSERSMITH.
CART.
APPLICATION FILED JUNE 24, 1919.

1,319,235.

Patented Oct. 21, 1919.
2 SHEETS—SHEET 1.

Inventor
Edgar C. Messersmith
by Cuper & Popp
Attorneys.

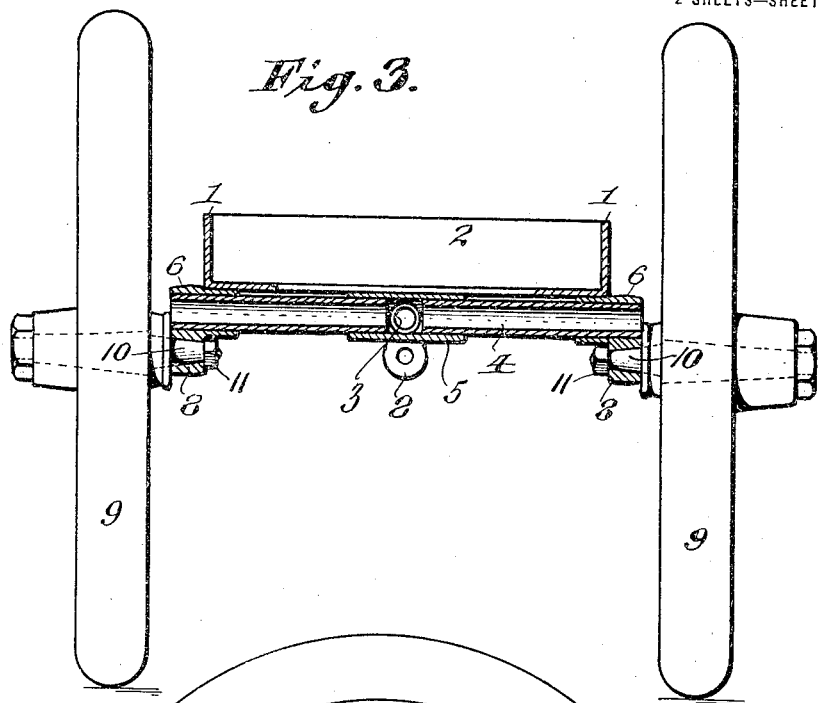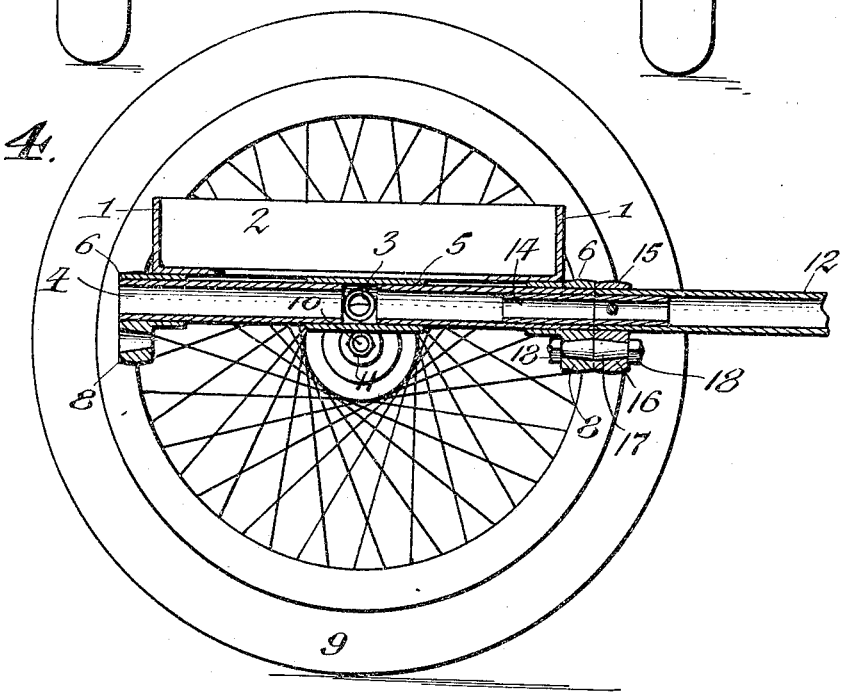

UNITED STATES PATENT OFFICE.

EDGAR C. MESSERSMITH, OF BUFFALO, NEW YORK, ASSIGNOR TO CYGNET MFG. CO., INC., OF BUFFALO, NEW YORK, A CORPORATION OF NEW YORK.

CART.

1,319,235.   Specification of Letters Patent.   Patented Oct. 21, 1919.

Application filed June 24, 1918. Serial No. 241,478.

*To all whom it may concern:*

Be it known that I, EDGAR C. MESSERSMITH, a citizen of the United States, residing in Buffalo, county of Erie, and State of New York, have invented new and useful Improvements in Carts, of which the following is a specification.

This invention relates to a cart which is capable of being re-arranged so that the same has a narrow gage or width between the tread of its wheels or a comparatively wide gage between said treads, and more particularly to a cart of this character which is designed for transporting material during warfare either in a comparatively narrow trench which requires a narrow tread vehicle or upon the surface of the ground where a wide tread vehicle may be employed and a load carried with less liability of tipping laterally.

It is the object of this invention to provide a cart having this capacity which is capable of being produced at low cost, which is strong and durable in construction and which can be quickly and easily adjusted so as to serve either as a narrow cart or as a wide cart and utilize the same parts in either of these organizations of the same.

Figure 1:
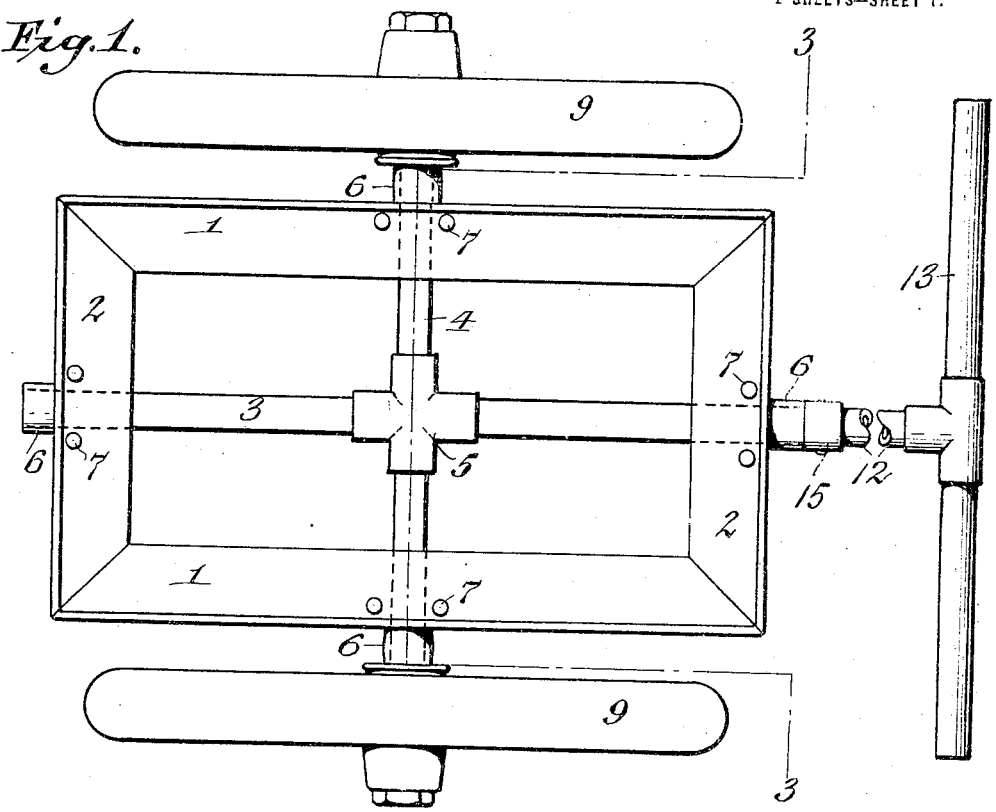
Figure 2:
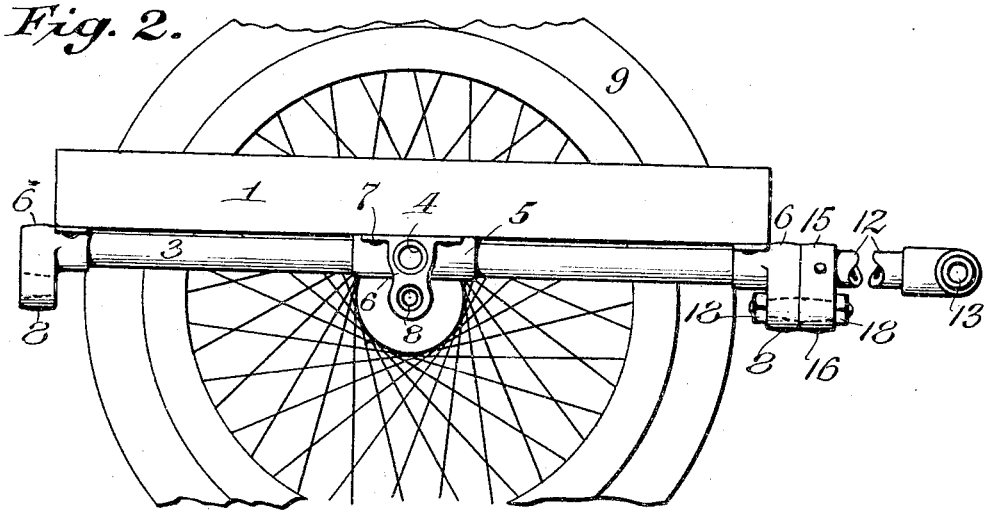

In the accompanying drawings:

Figure 1 is a top plan view of this improved cart, partly broken away, and showing the wheels arranged adjacent to opposite long sides of the frame. Fig. 2 is a side elevation of the same, partly broken away, and the near wheel removed. Fig 3 is a vertical transverse section of the cart taken through the short axle, on line 3—3, Fig 1. Fig 4 is a similar section—but showing the wheels applied to opposite ends of the long axle and the handle applied to one end of the short axle for using the cart with a wide tread or wheel base.

Similar characters of reference refer to like parts throughout the several views.

The main frame of this cart is of oblong form and the same may be either moved with its major axis parallel with the line of movement of the cart or with its minor axis parallel with such line of movement, thereby enabling the cart to be used either as a wide tread cart or a narrow tread cart depending upon the particular conditions under which the same is employed. This frame may be of any suitable construction but as shown in the drawings the same is rectangular and constructed of two longitudinal bars 1, 1 and two transverse bars 2, 2, these bars being preferably constructed of angle iron and connected with each other in any suitable or well known manner.

3 represents a long axle which is arranged lengthwise underneath the body midway between the long bars of the same and 4 a comparatively short axle arranged transversely underneath the body midway between opposite short bars of the frame. These two axles are preferably constructed of tubular metal and the intersecting parts of the same within the center of the frame are connected by means of a cross-shaped fitting or coupling 5. At its opposite outer ends each of these axles is provided with a coupling bracket 6 of metal which is brazed or otherwise secured to the exterior of the respective axle and also connected with the adjacent part of the main frame by means of rivets 7 or the like. Each of these brackets is provided below the respective axle with a coupling socket or eye 8 the bore or opening of which is preferably of inwardly tapering form and the outer side of which is preferably flush with the respective axle end.

9, 9, represent two supporting wheels of any suitable construction each of which is pivotally mounted on the outer end of a horizontal axle arm 10. The inner end of each of these axle arms tapers inwardly and is adapted to engage the socket 8 of the coupling bracket on the end of the short axle or the coupling socket on one of the ends of the long axle and to be retained in engagement therewith by means of a screw nut 11 applied to the inner end of this axle arm and engaging with the inner side of the respective coupling eye or socket.

For the purpose of enabling the cart to be pushed or pulled convenienly the same is provided with a handle which preferably comprises a longitudinal stem 12 and a transverse grip 13 applied to the outer end of the stem. This handle is adapted to be detachably connected with one or the other of the outer ends of either of said axles for which purpose the inner end of the stem of the handle is provided with a shank 14 adapted to engage slidably with the tubular outer end portion of one of the axles, a bracket 15 is secured to the inner part of this stem and provided on its lower side with a coupling eye or socket 16 the opening of which tapers outwardly, and a coupling pin or bolt 17 which has its opposite ends tapering outwardly and adapted to engage one end with the tapering socket of the handle and its opposite end with the tapering socket on the respective axle, and screw nuts 18 applied to the outer ends of the coupling bolt or pin and engaging with the adjacent sides of the coupling eyes on the respective axle and handle, as best shown in Figs. 2 and 4.

When this cart is to be used where only a narrow roadway is available, as for instance when transporting ammunition, food, medical supplies or wounded soldiers in a trench, the supporting wheels are mounted at opposite ends of the short axle and the handle is applied to one end of the long axle, as shown in Figs. 1, 2 and 3. In this organization of the parts a comparatively narrow gage-cart is produced in which the body is extended lengthwise of the direction of travel and permits of carrying the maximum load in the trench with facility and convenience.

When it is desired to transport ammunition, food, medical supplies or other loads on the surface of the ground, the wheels may be removed from the short axle and applied to opposite ends of the long axle and the handle may be applied to one end of the short axle as indicated in Fig. 4. In this last mentioned way large loads may be transported with sufficient lateral stability. All of the brackets on the several ends of the short and long axles are provided with like fittings and the fittings on the axle arms of the wheels are also identical, so that it is possible to interchange these wheels and assemble them relatively to the frame and axles indiscriminately. It is possible to also attach the handle to any one of the fittings on the several ends of the axles, thereby avoiding the necessity of selecting a particular end, and facilitating the changing of the cart from a wide gage to a narrow gage or vice versa, to suit different conditions under which the same may be employed and also enabling the load to be either pushed or pulled as best suits the particular circumstances.

In converting this cart from a narrow-gage to a wide-gage tread, the same parts are used in different form of assembling the same, thereby avoiding the necessity of carrying about any extra unused parts which would be liable to become lost if any of the parts were not in active use at all times.

All of the parts of this cart are of simple construction which are not liable to get out of order and they are capable of being assembled and dismembered without the use of any special tools for this purpose, thereby rendering the same particularly suitable for use in warfare where quick action is necessary and special tools are undesirable.

I claim as my invention:

1. A cart comprising an oblong frame, a long axle secured lengthwise to said frame, midway between the long sides thereof, a short axle secured transversely to said frame, midway between the short sides thereof, and a pair of wheels, and means for mounting said wheels on the outer ends of either of said axles.

2. A cart comprising an oblong frame, a long axle secured lengthwise to said frame, midway between the long sides thereof, a short axle secured transversely to said frame, midway between the short sides thereof, a pair of wheels, means for mounting said wheels on the outer ends of either of said axles, and a handle adapted to be detachably connected with an outer end of either said long or said short axles.

3. A cart comprising an oblong frame, a long axle secured lengthwise to said frame, midway between the long sides thereof, a short axle secured transversely to said frame, midway between the short sides thereof, a pair of wheels, and means for mounting said wheels on the outer ends of either of said axles comprising brackets mounted on the outer ends of said axles and each having a socket, and axle arms each of which pivotally supports on its outer end one of said wheels and is detachably secured at its inner end in one of said sockets.

4. A cart comprising an oblong frame, a long axle secured lengthwise to said frame, a short axle secured transversely to said frame, a pair of wheels, means for mounting said wheels on the outer ends of either of said axles comprising brackets mounted on the outer ends of said axles and each having a socket, and axle arms each of which pivotally supports on its outer end one of said wheels and is detachably secured at its inner end in one of said sockets, a handle, and means for detachably connecting said handle with the outer end of any one of said axles comprising a bracket arranged on said handle, and a coupling connecting said handle bracket and the adjacent axle bracket.

5. A cart comprising an oblong frame, a long hollow axle secured lengthwise to said frame, a short hollow axle secured transversely to said frame, a pair of wheels, means for pivotally mounting said wheels on opposite ends of either of said axles comprising brackets mounted on the ends of said axles and axle arms each carrying one of said wheels and secured to one of said axle brackets, a handle, and means for detachably connecting said handle with the outer end of any one of said axles comprising a shank secured to the inner ends of said handle and slidably engaging the adjacent hollow end portion of the respective axle, and a bracket secured to the inner end of said handle and detachably connected with the bracket on the adjacent end of the respective axle.

EDGAR C. MESSERSMITH.